Feb. 13, 1951 W. HOGG 2,541,250
FLUID-TIGHT CLOSURE FOR A CYLINDER OR OTHER CONTAINER
Filed June 15, 1942
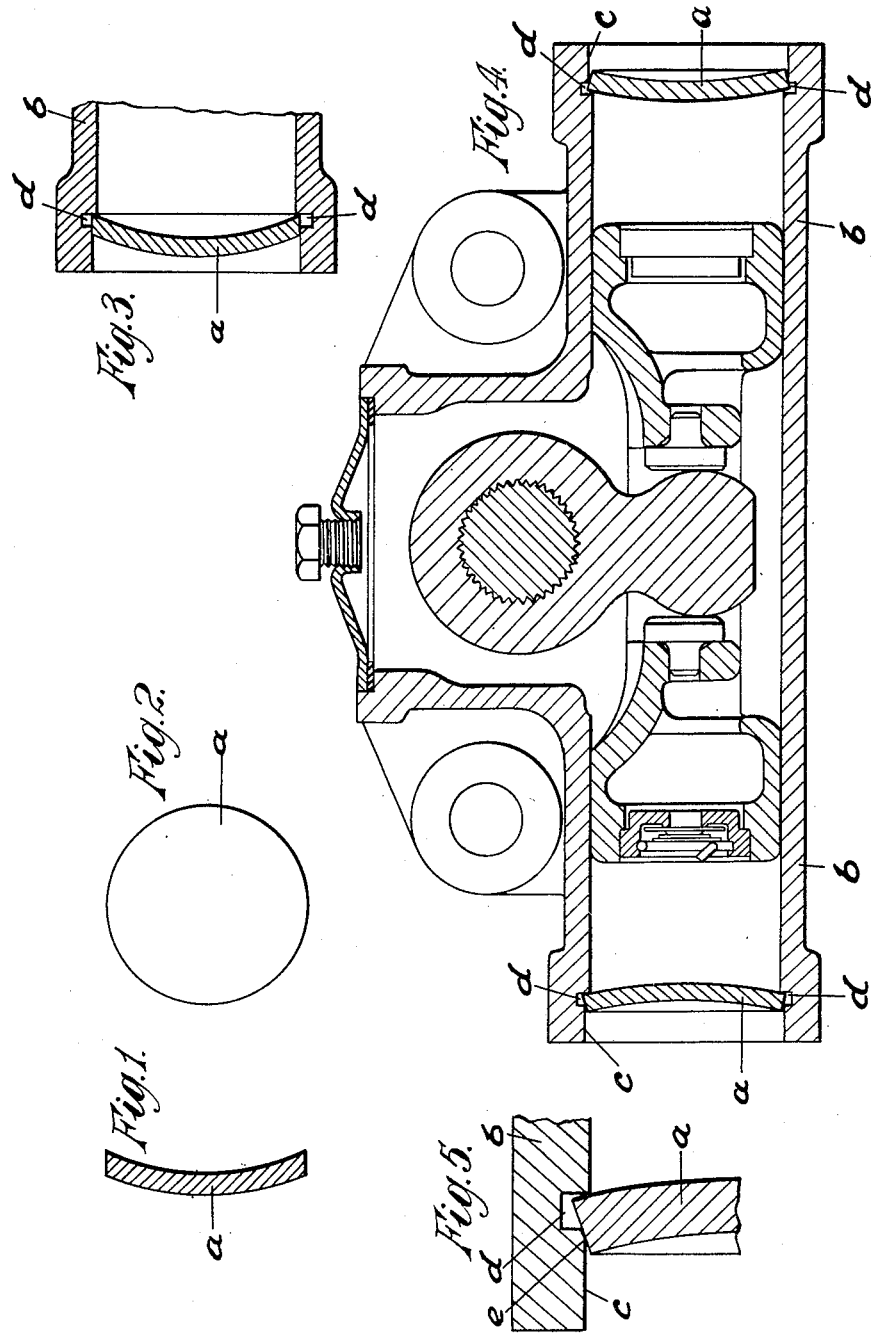
INVENTOR
WILLIAM HOGG
by Walter S. Bleston
ATTORNEY Patented Feb. 13, 1951

2,541,250

UNITED STATES PATENT OFFICE 2,541,250

FLUID-TIGHT CLOSURE FOR A CYLINDER OR OTHER CONTAINER

William Hogg, Sunbury-on-Thames, England, assignor to Girling Limited, Birmingham, England Application June 15, 1948, Serial No. 33,168
In Great Britain June 19, 1947

4 Claims. (Cl. 220—24.5)

This invention relates to a new or improved method of and means for making a fluid-tight closure for the end of a cylinder or other container.

The invention is primarily intended for closing the end or both ends of the cylinder of an hydraulic damper or shock-absorber which is subjected to high pressures, but it is applicable to a wide variety of other purposes and can be used wherever it is desired to close an end of a cylinder or the like with a permanent closure which will withstand high fluid pressures in the cylinder.

In making a permanent closure for a cylinder or the like in accordance with the invention the end of the cylinder is counter-bored for a short distance in from its end to a diameter slightly greater than that of the cylinder, and an annular recess of rectangular cross-section is machined in the wall of the counter-bore at its inner end.

A dished steel or other disc of substantial thickness is made with a plain cylindrical peripheral surface of a diameter substantially equal to the internal diameter of the counter-bore, the thickness of the disc being about twice the axial length of the annular recess in the counter-bore.

The disc is inserted into the counter-bore with its convex face outwardly until it abuts against the shoulder at the inner end of the recess, and axial pressure is applied to the disc, hydraulically or otherwise, to force it through the flat condition into a dished form again but with the convex face on the inside. This causes the peripheral surface of the disc to become frusto-conical with the edge of greatest diameter entering the annular recess and the conical face bearing against the corner or shoulder at the outer end of the recess, that is at the junction of the outer radial wall of the recess with the surface of the counter-bore.

The outward pressure of the disc on this corner or shoulder is sufficient to deform it into conformity with the coned peripheral surface of the disc and so provide a contact area or seating of appreciable axial length between the periphery of the disc and the wall of the counter-bore.

When the disc is subjected to the pressure of fluid in the cylinder the pressure tends to force the coned peripheral surface of the disc still more tightly into the coned seating which it has formed in the counter-bore, and any tendency for the pressure to flatten the disc increases the effective diameter of the disc and so increases the radial thrust of the disc against its seating.

Experiments have shown that a closure made in this way will readily withstand the very high pressures obtaining in hydraulic shock absorbers without any sign of leakage.

The extent to which the disc is inwardly dished in its final form may only be very slight, and an effective closure may be obtained by bringing the disc from its initial outwardly convex form into a flat condition or only slightly past the flat condition so that its inward convexity is of very large radius.

One practical embodiment of the invention is applied to a closure for the ends of the cylinder of a double-acting shock absorber is illustrated by way of example in the accompanying drawings in which—

Figure 1 is a side elevation of a closure disc in accordance with the invention.

Figure 2 is an end elevation of the disc.

Figure 3 is a section of one end of a shock absorber cylinder showing the disc in position before deformation.

Figure 4 is a longitudinal section of the shock absorber showing the closures for both ends of the cylinder fixed in position.

Figure 5 is a fragmentary section on a larger scale showing the engagement of the edge of the closure disc with the cylinder.

A closure for the ends of a shock-absorber cylinder in accordance with the invention and as shown in Figures 1 and 2 consists simply of a dished steel or other metal disc $a$ of substantial thickness and having a plain cylindrical peripheral surface of a diameter slightly greater than that of the cylinder to be closed.

The end of the cylinder $b$ to be closed is counter-bored for a short distance in from the end as shown at $c$ in Figure 3 to a diameter substantially equal to that of the disc $a$, and at the inner end of the counter-bore an annular recess $d$ is machined in the wall, the axial length of the recess being about one-half of the thickness of the disc.

To fit the closure the disc is inserted into the counter-bore in the end of the cylinder with the convex face of the disc outwardly directed until the disc abuts against the shoulder formed by the inner end of the annular recess as shown in Figure 3.

Axial pressure is then applied to the disc, hydraulically or by any other convenient means, to force the disc through the flat condition into a slightly dished form again but with the convex face on the inside.

Figure 4 shows closure discs fitted to each end of the shock-absorber cylinder $b$. It will be seen from Figure 4 and also from the enlarged fragmentary view, Figure 5, that the deformation of the disc from its original form causes the peripheral surface of the disc to become frusto-conical with the edge of greatest diameter at the inside and entering into the annular recess *d*. The conical peripheral surface bears tightly against the corner or shoulder at the outer end of the recess, and the outward pressure of the disc on this corner or shoulder is sufficient to deform it into conformity with the coned peripheral surface of the disc as shown at *e* in Figure 5 so that there is a contact area or seating of appreciable axial length between the periphery of the disc and the wall of the counter-bore in the cylinder.

The improved closure is extremely simple and economical to manufacture and fit, and where such a closure is used for each end of the cylinder of a double-acting shock absorber as shown in Figure 4 it facilitates and cheapens production as it allows the cylinder to be bored straight through.

I claim:

1. Means for making a fluid-tight closure for the end of cylinder comprising a dished disc of substantial thickness having a cylindrical peripheral surface of a diameter greater than the inside diameter of said cylinder, an enlargement of the end of said cylinder of a diameter substantially equal to that of said disc, and an annular recess of rectangular cross-section and of an axial width substantially equal to half the thickness of said disc in the wall of said cylinder at the inner end of said enlargement, said disc with its convex side outwardly being adapted to be forced into said enlargement and against the shoulder formed by the inner end of said annular recess by axially applied pressure such that the disc is deformed into an inwardly convex dished form to cause its peripheral surface to become frusto-conical and to be forced against the outer corner of said recess to flatten said corner into conformity with the conical periphery of the disc.

2. In a cylinder, a fluid-tight closure of a cylinder end, comprising an axial extension of the cylinder wall enclosing the space destined for the reception of the fluid, said extension being of a somewhat larger inner diameter than said cylinder space, an inner peripheral recess being provided between said cylinder space and said extension, and a dished disc of a thickness larger than the axial width of said recess and of a frusto-conical peripheral face with the larger diameter on the convex side of said disc, said disc engaging into said recess with its edge of larger diameter so as to abut with its convex side against the shoulder formed by said recess adjacent said cylinder space, and said disc bearing with its peripheral face against the recess corner adjacent said inner end of said extension.

3. A device as claimed in claim 2, the corner between said recess and said outer extension end being flared and constituting a conically shaped seating surface for said peripheral disc face.

4. A cylinder having a permanent fluid-tight closure for at least one end of the cylinder, comprising a dished disc of substantial thickness having a cylindrical peripheral surface of a diameter greater than that of said cylinder, an enlargement of the end of said cylinder of a diameter substantially equal to that of said disc, and an annular recess of rectangular cross-section and of an axial width substantially equal to half the thickness of said disc in the wall of said cylinder at the inner end of said enlargement, said disc with its convex side outwardly being adapted to be forced into said enlargement and against the shoulder formed by the inner end of said annular recess by axially applied pressure such that the disc is deformed into an inwardly convex dished form to cause its peripheral surface to become frusto-conical and to be forced against the outer corner of said recess to flatten said corner into conformity with the conical periphery of the disc.

WILLIAM HOGG.

REFERENCES CITED

The following references are of record in the file of this patent:

UNITED STATES PATENTS

| Number | Name | Date |
|---|---|---|
| 1,432,475 | Lord | Oct. 17, 1922 |
| 1,801,006 | Jacoby | Apr. 14, 1931 |
| 1,979,491 | Rossman | Nov. 6, 1934 |
| 2,011,460 | Snyder | Aug. 13, 1935 |

FOREIGN PATENTS

| Number | Country | Date |
|---|---|---|
| 134,900 | Switzerland | Nov. 16, 1929 |
| 313,279 | Italy | Dec. 21, 1933 |